July 31, 1962 W. V. CHERY 3,046,964
AUTOMOBILE STARTING DEVICE
Filed Jan. 11, 1960

*INVENTOR.*
WALTER V. CHERY
BY
Charles L. Overchuck
*attorney*

United States Patent Office 3,046,964
Patented July 31, 1962

3,046,964
AUTOMOBILE STARTING DEVICE
Walter V. Chery, 908 Fairview Ave., Meadville, Pa.
Filed Jan. 11, 1960, Ser. No. 1,622
5 Claims. (Cl. 123—179)

This invention relates to automatic starting devices for motor vehicles and, more particularly, to devices for automatically starting an automobile equipped with an automatic transmission to start the engine when the vehicle is not in motion.

Vehicles equipped with automatic transmissions usually have an interlock switch which prevents the engine from being started by the electric starter unless the shifting lever is shifted to a neutral position. This feature is necessary so that an operator will not inadvertently start the engine and the vehicle run away when it is stopped and has been standing for some time with the transmission in gear. Otherwise, when the engine started, the vehicle would immediately surge forward, endangering life and property; however, when the engine on an ordinarily equipped motor vehicle stops, for example, at a stop light, it is necessary for the operator to expend time shifting into neutral before he can restart the engine. This requires time, confusion, and delay with the result that it may even lead to accidents with other vehicles.

The automatic starting device disclosed herein is designed to restart the engine only after the engine has been started manually and, consequently, a water or fluid pressure built up by the water pump in the vehicle. Therefore, the switch disclosed herein cannot inadvertently cause the vehicle to surge forward when the vehicle has been parked with the shifting lever in gear but will only start the vehicle when the engine stops and only within a short interval of time after the engine has stopped. This will prevent accidents at intersections which also result from a stalled engine which can only be started by shifting the transmission to a neutral position and then turning the key. The device disclosed herein will start the engine without any action on the part of the driver and will start it automatically.

It is, accordingly, an object of the present invention to provide an improved starting device for a vehicle.

Another object of the invention is to provide a starting device which will be actuated only a short interval after the engine has stopped.

Still another object of this invention is to provide a starting switch for an automobile which is actuated by the pressure of cooling fluid in the vehicle engine.

A further object of the invention is to provide a switch which will be actuated when the fluid pressure due to the engine's running is reduced a substantial amount.

A still further object of the invention is to provide a starting device which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
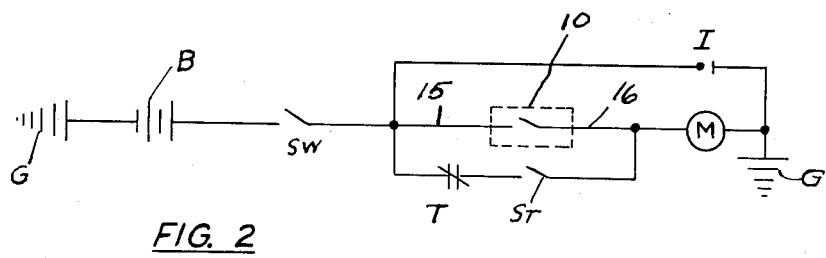
FIG. 2 is a view of the wiring diagram for the electrical ignition system and starting system of the vehicle.

Now with more particular reference to the drawing, the ignition wiring and starter wiring are shown in FIG. 2. A starting motor M is shown which is connected through a one-way clutch mechanism to the engine in the usual manner. One side of the starter motor M and one side of a battery B are both connected to ground G. An ignition system illustrated by I indicates the spark plug, spark coil, and usual related equipment. The battery B is connected through an ignition switch SW and an interlock switch 10 to the motor M. This also connects the ignition I to the battery B.

It will be noted that the starter motor M can be actuated when the ignition switch SW is on, either automatically through the improved switch 10 or when the transmission is in neutral, through an interlock switch T which is connected to the transmission lever in the usual manner and then through to a switch ST which may be a second point on the ignition switch to operate the starter in the usual manner. In other words, the circuit shown in FIG. 2 is identical to the usual starter motor circuit and ignition circuit in an automobile except that the switch 10 is connected in parallel with the interlock switch T and the starter switch ST.

Figure 1:
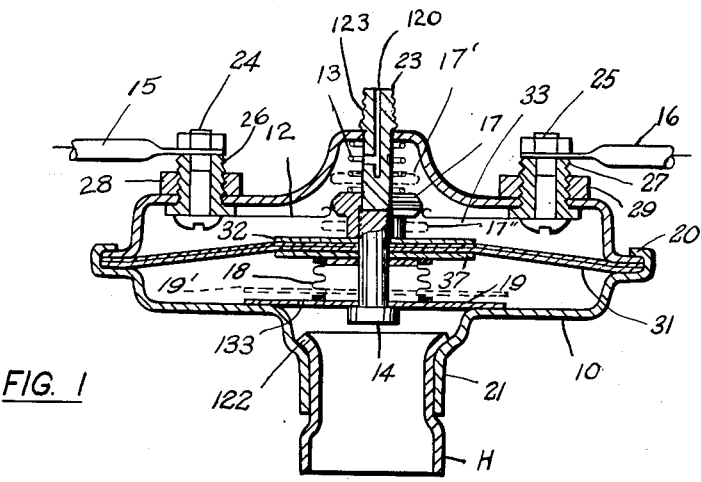
FIG. 1 is a view of a starting switch according to the invention.

The improved switch shown in FIG. 1 has a housing for the switch 10 made up of two cup shaped portions facing each other and sealed together at 20 by a spinning operation or other suitable means. The lower half of the housing has a tubular portion 21 integral therewith which could be formed by spinning, drawing, or any suitable manner. To this is connected a pipe or line H which may be connected to a hose or the like. The pipe H may be connected to the tubular member 21 by inserting it thereinto and swaging an end 122 over into sealing relation or by other suitable means of connection.

The upper half of the housing is properly recessed to receive a shaft 23 and a spring 13. The spring 13 is a compression spring which fits into the recess in the upper half of the housing at one end and the other end bears on a contactor plate 17.

The shaft 23 has a bore 120 therein. The contactor plate 17 is fixed to a diaphragm 31 and is received on and freely slides on the shaft 23. A fluid line such as a suction line to a vacuum system may be connected to a surface 123. Thus, the suction will urge the diaphragm 31 upwardly to bring the contactor plate 17 to position 17' when the engine is running.

If the engine should stop, the pressure above the diaphragm 31 will increase toward zero and the spring 13 will force the plate or collar 17 down to make contact with contacts 33. Should the engine not start readily or if the switch SW is turned off, the spring 13 will force the contactor 17 to the position 17".

It will be apparent that the pipe H may be connected to a pressure line such as the cooling system or oil system, if desired. Therefore, the device disclosed will operate either on liquid pressure or vacuum.

The shaft 23 may be made of two pieces as shown.

Wires 15 and 16 are connected between the starting motor M and the ignition switch SW as indicated in FIG. 2 and their terminals are connected to screws 24 and 25. The screws 24 and 25 are made of metallic material and fit into threaded sleeves 26 and 27 which are made of insulating material and threaded on the outside to receive nuts 28 and 29. Therefore, the sleeves 26 and 27 insulate the wires 15 and 16 from the housing.

The diaphragm 31 is sealingly clamped between the outer peripheral flange on the upper housing member and the lower housing member at its outer periphery. The diaphragm 31 may be made of flexible non-metallic material or it could be made of thin flexible metal. The center of the diaphragm 31 is supported between washers 32 and 37 and is fixed thereto. The shaft 23 extends through the washers 32 and 37 and is attached to the contactor 17 at its upper end. The contactor 17 has an outwardly directed flange which is rounded at its periphery so that it will slide between contacts 12 and 33 which are connected to the screws 24 and 25.

A plate 19 rests on the housing around the periphery of the tubular member 21 and is urged away from the diaphragm 31 by a bellows seal 18. The bellows seal 18 may be made of a flexible material or any suitable type and it need not have a spring therein; however, if it does have a spring, the spring must be weaker than the spring 13 so that the pressure thereof will be overcome by the spring 13 when the fluid pressure in the line H is reduced. A head 14 of the shaft 23 extends through the plate 19 and may slide loosely therein. A leakage results around the periphery of the plate 19 between it and the housing when pressure under the diaphragm 31 changes so that when the pressure in the line H is reduced, fluid will be forced by the diaphragm 31 and the spring 13 out from the space between the housing and the diaphragm 31 into the hose so that the contactor 17 may make the contact. An orifice hole 133 may be provided to assist in the discharge of this fluid; however, this orifice hole will have to be of a size that will control the flow of fluid from between the diaphragm 31 and the housing.

When the engine is stopped as when the automobile is parked, the contactor 17 will move to the position 17″ and, therefore, there will be no connection between the contacts 12 and 33.

In order to start the engine initially, the transmission must be shifted to neutral so that the switch T will be closed. Then when the operator turns on the ignition switch SW and rotates the key further to close the switch ST, the motor M will start the automobile engine. The fluid pressure in the line H which may be from the water pump or which could be from the oil pressure of the vehicle will, therefore, increase as the engine starts and will force the fluid to flow between the plate 19 and the housing to force the diaphragm 31 upward and to force the contactor 17 past the contacts 12 and 33 to the position 17′ and plate 19 will be pulled to position 19′ by head 14 on shaft 23.

If the engine should inadvertently stop while the vehicle is not in motion and even though the switch T be opened as a result of the transmission being shifted into gear, the fluid pressure in the line H will decrease as the engine comes to a stop. Therefore, the spring 13 will force the diaphragm 31 downwardly and cause the contactor 17 to close the gap between the contacts 12 and 33. When contactor 17 bridges the gap between contacts 12 and 33, plate 19 will return to the position shown. Up to this point, fluid from below diaphragm 31 was escaping rapidly and diaphragm 31 moved rapidly. When plate 19 reaches the full line position, all other fluid will have escaped through orifice hole 133. Thus, from the time plate 19 reaches the position shown until diaphragm 31 and the parts attached thereto come to rest, diaphragm 31 as well as contactor 17 moves slowly. Therefore, contactor 17 will maintain contacts 12 and 33 closed for a substantial time while the starter is trying to start the vehicle. This will again connect the motor M to the battery B and cause it to start the engine. If the vehicle engine does not start promptly, fluid from hole 133 will allow diaphragm 31 to move contactor 17 to open position.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An electrical ignition circuit for a vehicle having an engine comprising a battery having one side thereof connected to ground and the other side connected in series with an ignition switch, said ignition switch connecting said battery to a three branch parallel circuit, one branch of said parallel circuit including the ignition system of said vehicle, the second branch including a starting switch in series with a transmission switch closed when said vehicle is shifted to engage its gears, said starting switch and said transmission switch being connected in parallel with an improved starting switch, said improved starting switch, said transmission switch, and said starting switch being connected in series with the starter motor of said vehicle, said improved starting switch having means thereon to automatically hold it open during engine operation and further means to close said improved starting switch for a predetermined time when said engine stops, and then to open the same.

2. A starting system for an engine having an ignition system comprising a battery, an ignition switch, and a starting motor, said battery being connected in series with said ignition switch, said ignition switch connecting said battery to said ignition system of said engine, and a circuit in parallel with said ignition switch comprising an improved starting switch, said improved starting switch and said ignition switch being connected in series with said starting motor, said improved starting switch having means thereon to automatically hold it open during engine operation and to close said improved starting switch for a predetermined time when such operation has stopped, and then to open the same.

3. The starting system recited in claim 2 wherein said improved starting switch comprises a housing, a diaphragm in said housing, and a tubular member adapted to be connected to the cooling fluid supply of said engine, said fluid supply having its pressure increased when said engine is running and decreased when said engine stops whereby one side of said diaphragm is connected in fluid pressure relation with said fluid supply.

4. The circuit recited in claim 1 wherein said means to hold said improved starting switch open and to close it for a predetermined time comprises an enclosed chamber having a diaphragm forming one side thereof, said chamber connected to a source of fluid put under pressure when said engine is running and having its pressure reduced when said engine stops, said fluid under pressure forcing said diaphragm to open said improved starting switch when said engine starts, and means allowing said fluid to escape from said chamber rapidly, then reducing the rate of flow of fluid from said chamber for a predetermined time after said engine stops.

5. The circuit recited in claim 4 wherein said means reducing the rate of flow of fluid from said chamber comprises a plate held open by said diaphragm when said fluid is under pressure, a large outlet from said chamber, said plate moving with said diaphragm to close said large outlet when said engine stops whereby the rate of movement of said diaphragm is reduced and said improved starting switch is held closed, and an orifice hole in said plate allowing said fluid to escape from said chamber at a lesser rate.

References Cited in the file of this patent

UNITED STATES PATENTS

| 1,068,945 | Taylor | July 29, 1913 |
| 1,593,222 | Russell | July 20, 1926 |
| 2,580,820 | Nardone | Jan. 1, 1952 |
| 2,606,456 | Dodge | Aug. 12, 1952 |
| 2,636,093 | Clark et al. | Apr. 21, 1953 |
| 2,767,277 | Wirth | Oct. 16, 1956 |
| 2,803,236 | Tamburello | Aug. 20, 1957 |
| 2,893,368 | Long | July 7, 1959 |
| 2,934,054 | Quinlan | Apr. 26, 1960 |

FOREIGN PATENTS

| 1,055,296 | Germany | Apr. 16, 1959 |